United States Patent
Voltz

(10) Patent No.: US 6,441,812 B1
(45) Date of Patent: *Aug. 27, 2002

(54) HARDWARE SYSTEM FOR GENLOCKING

(75) Inventor: Christopher D. Voltz, Houston, TX (US)

(73) Assignee: Compaq Information Techniques Group, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/828,522

(22) Filed: Mar. 31, 1997

(51) Int. Cl.⁷ .................................................. G09G 5/00
(52) U.S. Cl. ........................ 345/213; 345/204; 348/510; 348/500; 348/540; 348/544
(58) Field of Search ................................ 345/115, 116, 345/302, 213, 204; 348/500, 510, 540, 536, 537, 542, 544

(56) References Cited

U.S. PATENT DOCUMENTS

| | | | |
|---|---|---|---|
| 4,346,407 A | * 8/1982 | Baer et al. ................... 345/213 |
| 4,628,541 A | 12/1986 | Beavers ....................... 455/603 |
| 4,658,247 A | 4/1987 | Gharachorloo .............. 340/747 |
| 4,775,928 A | 10/1988 | Kendall et al. .............. 364/747 |
| 4,954,819 A | 9/1990 | Watkins ....................... 340/721 |
| 5,014,128 A | * 5/1991 | Chen .......................... 348/500 |
| 5,155,595 A | * 10/1992 | Robison ...................... 348/500 |
| 5,185,603 A | * 2/1993 | Medin ......................... 345/213 |
| 5,291,275 A | 3/1994 | Lumelsky .................... 348/441 |
| 5,451,981 A | 9/1995 | Drako et al. ................. 345/118 |
| 5,488,393 A | 1/1996 | Wood et al. ................. 345/213 |
| 5,502,462 A | 3/1996 | Mical et al. ................. 345/185 |
| 5,543,824 A | 8/1996 | Priem et al. ................. 345/201 |
| 5,572,698 A | 11/1996 | Yen et al. .................... 395/437 |
| 5,610,663 A | 3/1997 | Nan et al. .................... 348/542 |
| 5,877,741 A | * 3/1999 | Chee et al. .................. 345/113 |

OTHER PUBLICATIONS

Phase–locked loop; NE/SE54/Philips Semiconductors; Aug. 31, 1994; pp. 1–9.
Application Note/AN177; "An overview of the phase–locked loop (PLL)"; Philips Semiconductors; Dec. 1988; pp. 1–6.
Application Note/AN179; "Circuit Description of the NE564"; Philips Semiconductors; Dec. 1991; pp 1–6.
Application Note/AN180; "Frequency synthesis with the NE564"; Philips Semiconductors; Dec. 1988; pp. 1–3.
Application Note/AN182; "Clock regenerator with crystal–controlled phase–locked loop VCO (NE564)"; Philips Semiconductors; Dec. 1991; pp. 1–10.
"Gateway 2000 Sells Destination Big Screen PC Through Retail Chains"; Internet article; Aug. 20, 1996; pp. 1–4.
"Gateway 2000 Launches Destination Big Screen PC Featuring 31–inch Monitor"; Internet article; Mar. 21, 1996; pp. 1–5.

(List continued on next page.)

Primary Examiner—Bipin Shalwala
Assistant Examiner—Jimmy H. Nguyen
(74) Attorney, Agent, or Firm—Akin, Gump, Strauss, Hauer & Feld, LLP

(57) ABSTRACT

A computer system includes a graphics controller with a first refresh rate and a first horizontal synchronization signal; a secondary source of video data having a second refresh rate and a second horizontal synchronization signal; and a genlock unit for reconciling the first refresh rate of the graphics controller with the second refresh rate of the secondary source. The genlock unit outputs a clock signal with a frequency modulated to reconcile the first refresh rate and the second refresh rate by monitoring the phase differences of the first horizontal synchronization signal and the second horizontal synchronization signal in response to a first control signal and outputs a clock signal at a frequency corresponding to a selected clock frequency in response to a second control signal.

18 Claims, 6 Drawing Sheets

OTHER PUBLICATIONS

"The Big–Tube PCTV"; PC Online/Trends Online; May 28, 1996; pp. 1–3.

"Destination Features"; Internet article; Aug. 21, 1996; pp. 1–5.

"Telefuzion"; Internet article; March. 12, 1997; pp. 1–2.

"High–Tech; Now you can tune your TV to the Internet"; Mike Snider; USA Today; Sep. 18, 1996; pp. 1–2.

Advanced Power Management (APM); Bios Interface Specification; Revision 1.1; Sep. 1993; pp. 1–59.

* cited by examiner

HARDWARE SYSTEM FOR GENLOCKING

BACKGROUND OF THE INVENTION

1. Field of the Invention

The present invention relates to computer graphics, and more particularly to the generation of a refresh rate in a computer graphics system.

2. Description of the Related Art

Referring to FIG. 1, a conventional graphics subsystem 10 is shown. The graphics subsystem 10 includes a graphics controller 14 having a clock logic unit 16, video digital to analog convertor (VDAC) 18 and video input unit 20. The graphics controller 14 communicates with a host processor, such as a microprocessor, by way of a host bus HBUS. The graphics controller receives instructions, data to be processed for display, and/or graphics data from the host.

The graphics controller 14 interfaces with a graphics memory 22 through a control line CTRL and a data bus, bus RDATA. The graphics controller 14 sends and receives graphics data to and from the graphics memory 22 through a random access port in the graphics memory 22 over bus RDATA. The graphics memory 22 is typically a frame buffer having banks of random access memory (RAM). The graphics memory 22 stores the graphics data to be displayed, generally in bit-mapped or other well-known formats.

When the graphics data is to be displayed, the graphics memory 22 outputs the stored graphics data onto bus RDATA to the video input unit 20 which communicates the graphics data to the VDAC 18. VDAC 18 compares the digital values of the graphics data to a look-up table that contains the matching analog voltage levels for three primary colors needed to create the indicated color, which in this embodiment are red, green and blue (RGB). The VDAC 18 then converts the digital video data into the analog values of the RGB colors, and outputs the analog values on the R, G, and B lines respectively to the monitor 24 for display.

The graphics subsystem 10 also includes a high speed clock generator 12, which typically includes a crystal oscillator. The high speed clock generator 12 outputs a clock signal CLK at a set frequency to the clock logic unit 16 in the graphics controller 14. The clock logic unit 16 generates various clock signals which control the timing of the operations of the graphics subsystem 10. For example, the clock logic unit 16 generates a clock signal MCLK that is inputted to the graphics memory 22. The MCLK signal controls the rate at which the graphics memory 22 presents the graphics data onto bus RDATA. The clock logic unit 16 outputs a clock signal at the same frequency to the video input unit 20 so that it may correctly latch the graphics data from the bus RDATA. The clock logic unit 16 also generates a clock signal to VDAC 18 which controls the pixel rate of the graphics data received from the video input unit 20.

Finally, the clock logic unit 16 generates two clock control signals: a vertical synchronization signal VSYNC and a horizontal synchronization signal HSYNC. The VSYNC and HSYNC signals control the refresh rate of the monitor 24, i.e. how frequently the monitor's image is redrawn.

In the conventional system of FIG. 1, the clock signals for the monitor 24, the graphics controller 14 and the graphics memory 22 are all derived from the CLK signal generated by the clock generator 12. In order to obtain a refresh rate of 60 Hz, for instance, for a 1024×768 resolution monitor, the VDAC 18 must convert one pixel of data every 21 nanoseconds, i.e., a pixel data rate of 47 MHZ. In order to meet this data rate, clock logic unit 16 may apply a higher clock rate of 47 MHZ to VDAC 18 than to the graphics memory 22 by dividing the signal CLK from clock generator 12, as is discussed in more detail in U.S. Pat. No. 5,488,393, issued Jan. 30, 1996 and entitled, "High-Speed Video Display System," which is incorporated by reference herein.

A problem arises however, when the input graphics data into the graphics memory 22 originates from a source other than the graphics controller 14. New technology now allows the integration of a computer system with a second device such as a television, telephone, laser disk player, etc. The video data from this secondary source is displayed on a computer monitor along with graphics data from the graphics controller 14.

The display of this video data creates a problem when the video data has a different refresh rate from the 60 Hz refresh rate of the graphics controller. For example, a television signal such as the ITU-BTU System M (NTSC) signal typically has a refresh rate of 59.94 Hz. In a computer/television integrated device, the television signal is converted into digital graphics data for storage in a graphics memory for display on a monitor. The 59.94 Hz refresh rate of the television signal must be reconciled with the 60 Hz refresh rate of the graphics subsystem, otherwise the video fields will be dropped or repeated. This dropping of fields results in jerky movements of items on the display of the monitor, also known as syncopation artifacts.

One solution is to reprogram the refresh rate of the graphics subsystem to 59.94 Hz to match the refresh rate of the television signal. However, the refresh rate of the television signal varies somewhat from the 59.94 Hz rate through time. This variation of the television signal would thus create a mismatch in refresh rates. In addition, video data from various other secondary sources may have different refresh rates, none of which match each other or the programmed refresh rate of the graphics subsystem.

Because of this mismatch between refresh rates of the graphics subsystem and a second source of video data, a need has arisen in the industry for an external control of the refresh rate of the graphics subsystem.

SUMMARY OF THE INVENTION

The present invention is directed to a computer system having a graphics controller with a first refresh rate and a first horizontal synchronization signal; a secondary source of video data having a second refresh rate and a second horizontal synchronization signal; and a genlock unit for reconciling the first refresh rate of the graphics controller with the second refresh rate of the secondary source. The genlock unit outputs a clock signal with a frequency modulated to reconcile the first refresh rate and the second refresh rate by monitoring the phase differences of the first horizontal synchronization signal and the second horizontal synchronization signal in response to a first control signal and outputs a clock signal at a frequency corresponding to a selected clock frequency in response to a second control signal.

The present invention is also directed to a method of generating a clock signal for a graphics controller in a computer system. The method includes the steps of determining that the computer system is operating in a first one of two modes, and in response to this step, generating the clock signal for the graphics controller at a frequency modulated to reconcile a refresh rate of the graphics controller and a refresh rate from a secondary source by monitoring the differences of the horizontal synchronization signal of the graphics controller and the horizontal synchronization signal of the secondary source. The invention further includes the step of determining that the computer system is operating in a second one of two modes, and in response thereto, generating a clock signal for the graphics controller at a frequency corresponding to a predetermined frequency.

BRIEF DESCRIPTION OF THE DRAWINGS

The present invention is now explained in more detail with reference to the following drawings, wherein like numerals are used to designate like parts.

DETAILED DESCRIPTION OF THE INVENTION

Figure 1:
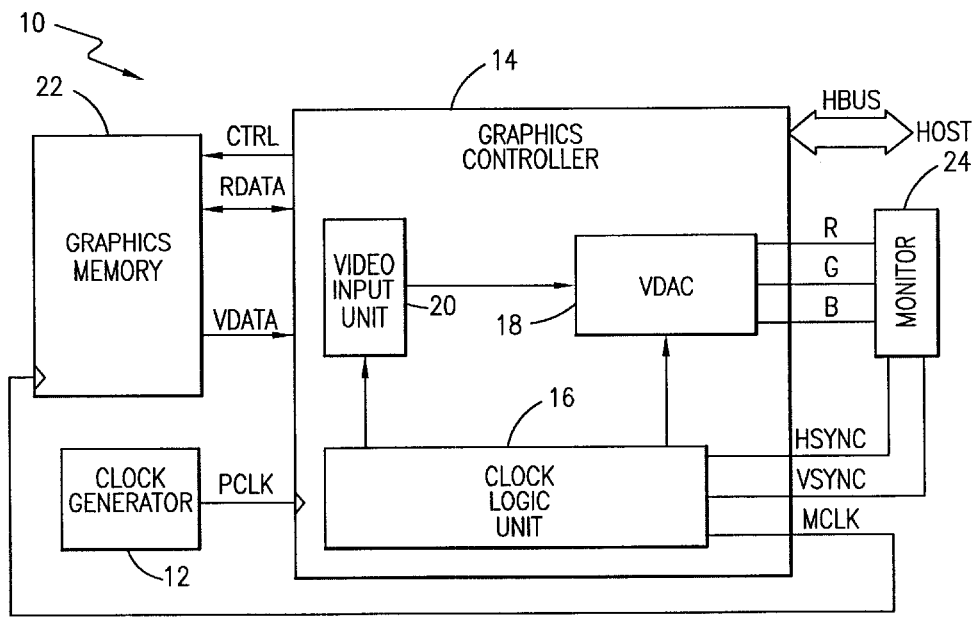
FIG. 1 illustrates a block diagram of a typical computer graphics subsystem.
Figure 2:
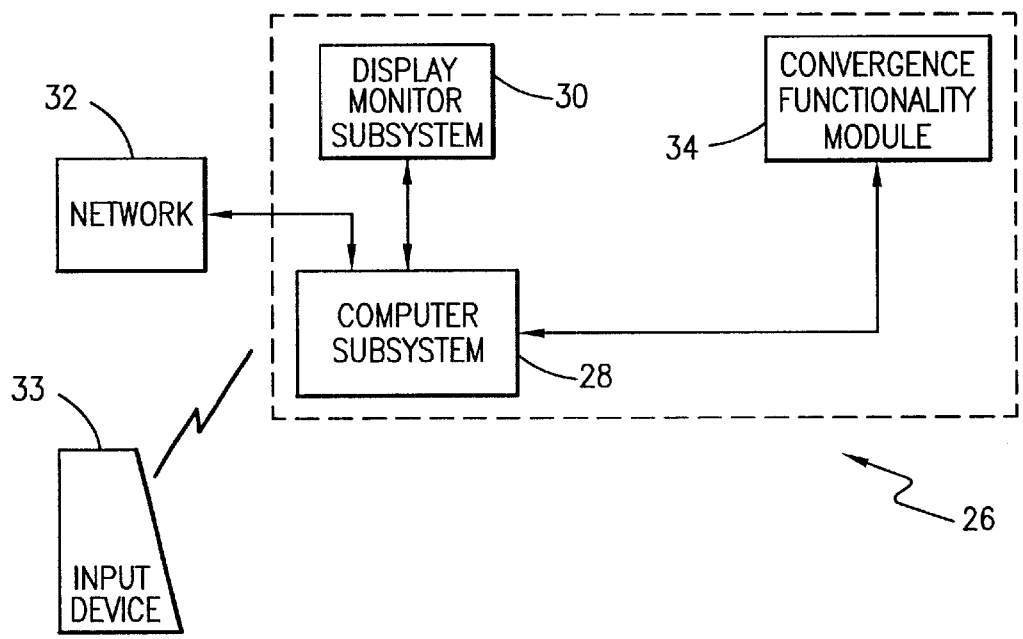
FIG. 2 illustrates a block diagram of a computer system in which the present invention may be implemented.

Referring now to FIG. 2, there is depicted a block diagram illustrating a system utilizing the present invention. The purpose of this block diagrams is to illustrate the features of the invention and the basic principles of operation of an embodiment thereof. This block diagram is not necessarily intended to schematically represent particular modules of circuitry or any particular data or control paths. FIG. 2 illustrates a system 26 in which the present invention may be implemented. The system 26 includes a computer subsystem 28 and display monitor subsystem 30. Though not shown in FIG. 2, the computer subsystem 28 includes a central processor unit coupled to a storage unit, a graphics subsystem and may further include a communication port for enabling communication to a network 32. The network 32 may be a local area network or a wide area network, such as the Internet, or any other type of network.

System 26 also includes convergence functionality modules 34 which are integrated with the computer subsystem 28. The convergence functionality modules 34 provide a dual functionality to the system 26 such that the system 26 may operate in computer mode and a second functional mode, such as a television, VCR, video gaming unit, video disc player, stereo, telephone, and/or other device mode. System 26 operates as a fully functional computer system in the first computer mode and operates with a functionality provided in response to the convergence functionality module 34 in the second mode, or operates in a combination mode that combines the functionality of the computer subsystem 28 and the convergence functionality module 34. An input device 33, such as a keyboard, remote or similar device, provides external control of the operation of the system 26.

The graphics subsystem, which is explained in more detail below, in the computer subsystem 28 manages the data input from the convergence functionality module 34 such that appropriately decoded and processed display signals are forwarded to drive suitable output devices, such as the display monitor subsystem 30, or an audio output device (not shown). For example, when the convergence functionality module 34 provides the functionality of a television receiver, the computer system 28 may operate as a fully functional computer in a first computer mode and a television in a second television mode. In television mode, the convergence functionality module 34 receives a video signal, such as the ITU-BTU System M (NTSC) signal, via any medium, digital or analog, such as cable, broadcast, or Digital Satellite System. The computer subsystem 28 interfaces with the convergence functionality module 34 to communicate the video data to the computer subsystem. The graphics subsystem in the computer subsystem 28 receives the video data, converts the video data into a standard graphics data format, such as a bit-mapped or other standard format, which is suitable for display on display monitor subsystem 30. In this manner, the video data received from the convergence functionality module 34 may be displayed on the display monitor subsystem 30.

In computer mode, system 26 operates as a typical computer and performs typical functions such as executing software and interfacing with a network, either a WAN, such as the Internet, or a LAN. System 26 may also interface with peripheral devices, such as fax/modems, CD-ROM players, and media storage such as hard and floppy drives.

In addition, system 26 may operate in a combination television/computer mode that combines the functions in the television mode and computer mode. The computer system may download information about a television program from the Internet or use the television mode to interact with the computer mode by having a small television window displaying a television show or video from an attached VCR while performing normal computer operations on the display monitor subsystem 30.

System 26 can thus be operated in various modes. The convergence of the functionality of a computer and a television into a single device permits the utilization of the communications bandwidth, mass storage and graphics of the computer to deliver, store and display applications during a traditional television viewing environment.

Figure 3:
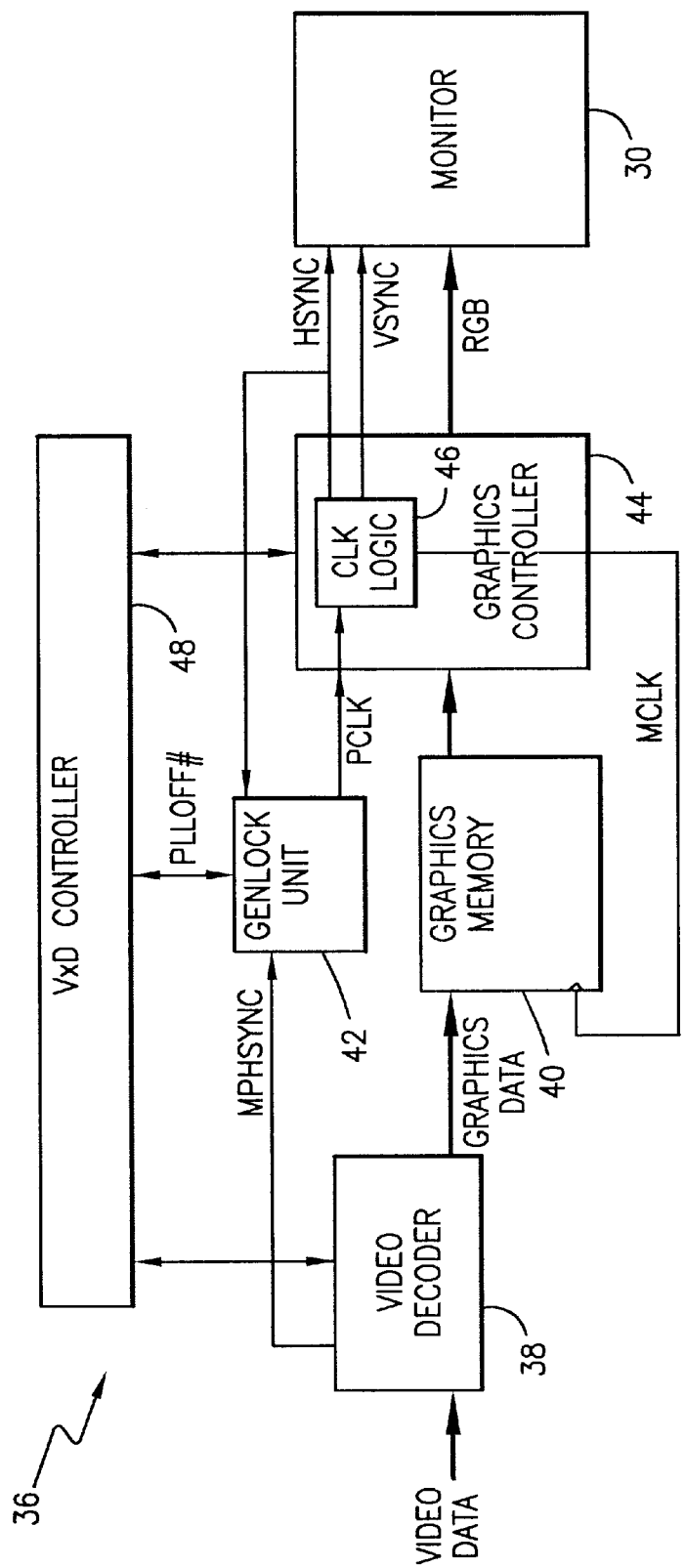
FIG. 3 illustrates a block diagram of the graphics subsystem of the present invention.

FIG. 3 illustrates the graphics subsystem 36 of system 26. The graphics subsystem 36 is typically a subsystem, such as in a video graphics board, in the computer subsystem 28 through a person of skill in the art would appreciate that portions of the graphics subsystem 36 may be integrated in the convergence functionality module 34 or the display monitor subsystem 30.

As depicted in FIG. 3, graphics subsystem 36 includes a video decoder 38, however it is contemplated that video decoder 38 could be included in convergence functionality module 34. In this exemplary embodiment, video decoder 38 receives video data from convergence functionality module 34. For example, the video data may be a NTSC television signal with a refresh rate of 59.94 Hz, though other video data which have a refresh rate that varies may benefit from this invention. The video decoder 38 converts the video data into digital graphics data which is stored in graphics memory 40.

The video decoder 38 also outputs a horizontal synchronization signal MPHSYNC which has a frequency corresponding to the horizontal refresh rate of the video data. The MPHSYNC signal is inputted into genlock unit 42. The genlock unit 42 generates a clock signal CLK which is inputted to the graphics controller 44.

The graphics controller 44 is a special purpose microprocessor for controlling the output of the graphics memory 40 and for executing graphics instructions such as line draw, block transfer, and the like. The graphics controller includes a VDAC (not shown) which converts graphics data from the graphics memory into RGB analog signals. The RGB analog signals control the output of the display monitor subsystem 30. In this embodiment, the graphics controller is a pre-manufactured integrated circuit, such as the ET6000 graphics controller, designed to process data in accordance with the video graphics array (VGA) standard. Alternatively, graphics controller 44 may be a discrete implementation or custom integrated circuit, such as an application-specific integrated circuit (ASIC) which customizes the functionality and performance of the graphics subsystem 36.

The graphics controller 44 also includes a clock logic unit 46 which receives the clock signal CLK from the genlock unit 42. The clock logic unit 46 generates a clock signal MCLK which is inputted to the graphics memory 40. The MCLK signal controls the presentation of graphics data to the graphics controller 44 from graphics memory 40. The clock logic unit 46 also generates a horizontal synchronization signal HSYNC and a vertical synchronization signal VSYNC. The HSYNC and VSYNC signals are both input signals to the display monitor subsystem 30 and control the refresh rate of the monitor. In addition, the HSYNC signal is fed back into the genlock unit 42.

The graphics subsystem 36 further includes the controller 48 which sends and receives control signals to and from the video decoder 38, genlock unit 42 and the graphics controller 44.

When enabled, the genlock unit 42 reconciles the refresh rate of the video data and the refresh rate of the graphics controller 44. The HSYNC signal from the graphics controller 44 provides a feedback signal from the graphics controller 44 which is compared to the MPHSYNC signal from the video decoder 38. In response, the genlock unit 42 locks onto the MPHSYNC signal and generates the CLK signal at the same frequency or rate as the MPHSYNC signal.

Figure 4:
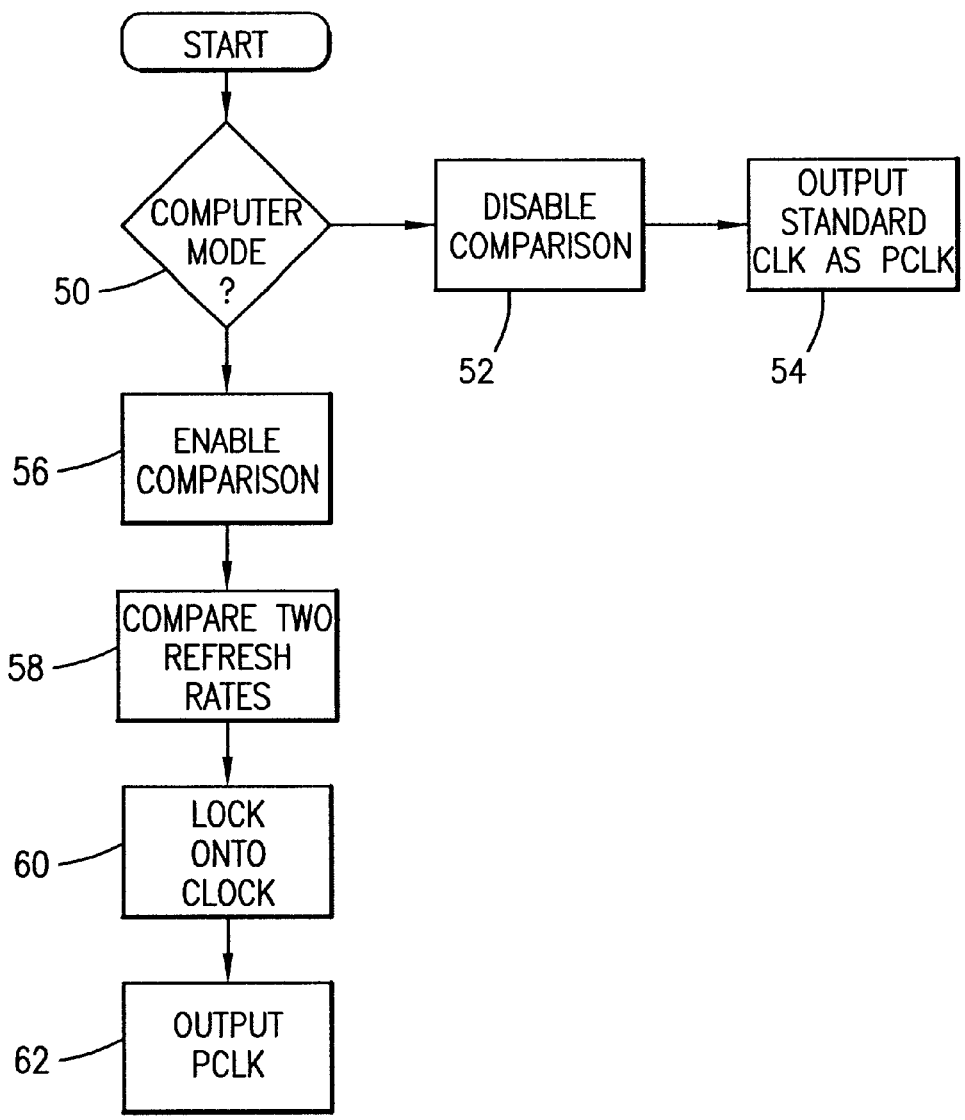
FIG. 4 illustrates flow chart of the operation of the graphics subsystem of the present invention.

The operation of the genlock unit 42 is discussed in more detail with respect to FIG. 4. In step 50, the controller 48 determines whether system 26 is in computer mode. When in computer mode, the graphics controller 44, not the video decoder 38, inputs graphics data to be stored into graphics memory 40, so there is no need to reconcile the refresh rate of video data from a second source with the refresh rate of the graphics controller 44. As a result, if the computer system 28 is operating in computer mode, the controller 48 disables the comparison of the two refresh rates in the genlock unit 42 in step 52, and the genlock unit 42 outputs the CLK signal at a standard or predetermined clock rate. In this embodiment, the standard clock rate is 14.31818 MHZ. As discussed above, the clock logic unit 46 of graphics controller 44 may divide and/or multiply the signal CLK in order to generate other clock signals with various frequencies. For example, the clock logic unit 46 may divide the CLK signal to generate a clock signal at a higher frequency for the VDAC of the graphics controller 44, depending on the resolution of the monitor 30 and the needed pixel rate to obtain that resolution.

If system 26 is operating in a second mode wherein it receives video data from the convergence functionality module 34 or other secondary source, either in lieu of or in addition to receiving graphics data from the graphics controller 44) then the Controller 48 enables the genlock unit 42, as shown in step 56. The genlock unit 42 compares the refresh rate from the secondary source on MPHSYNC signal input to the refresh rate from the graphics controller 44 on the HSYNC signal input. The genlock unit 42 uses the MPHSYNC signal as its reference signal. It locks onto the refresh rate of the MPHSYNC signal in step 60 and outputs the CLK signal which is reconciled by the differences of the HSYNC signal and the MPHSYNC signal, as shown in step 62.

If the MPHSYNC signal varies with respect to the HSYNC signal, the variation appears as a change in phase that acts as an error correction signal to correct the frequency of the CLK signal to match the altered refresh rate of the MPHSYNC signal. The genlock unit minimizes the phase difference between the MPHSYNC and HSYNC signals. Due to the feedback mechanism of the HSYNC signal, the frequency difference between the signals should be minimal.

The genlock unit 42 thus provides an external control of the graphics controller 44 refresh rate. This external control allows the reconciling of the refresh rates of the secondary source and the graphics controller by the genlock unit 42 to be disabled and to instead generate a standard clock signal. Because the graphics controller 44 generates the MCLK signal for the graphics memory 40 from the input CLK signal from the genlock unit 42, the operation of the genlock unit 42 affects the MCLK as well as the refresh rate of the graphics controller 44.

Figure 5A:
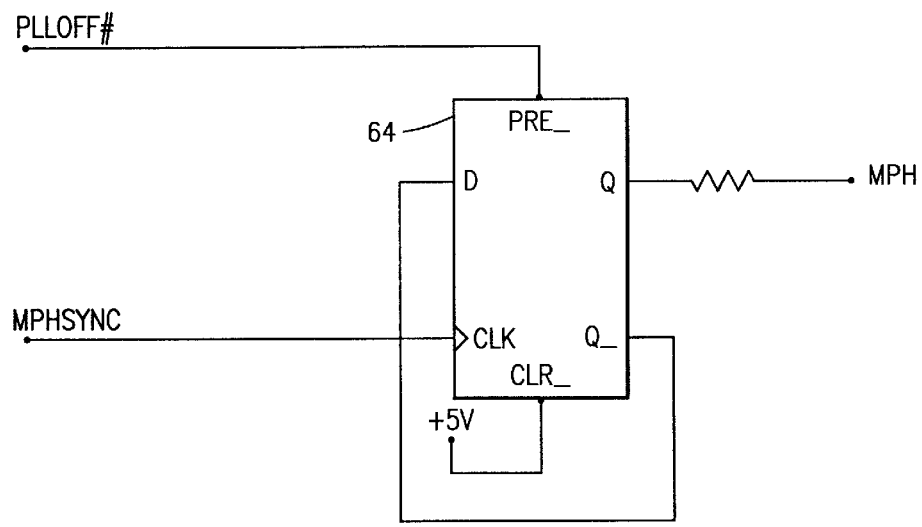
FIGS. 5a and 5b illustrate the genlock unit of the present invention in more detail.
Figure 5A:
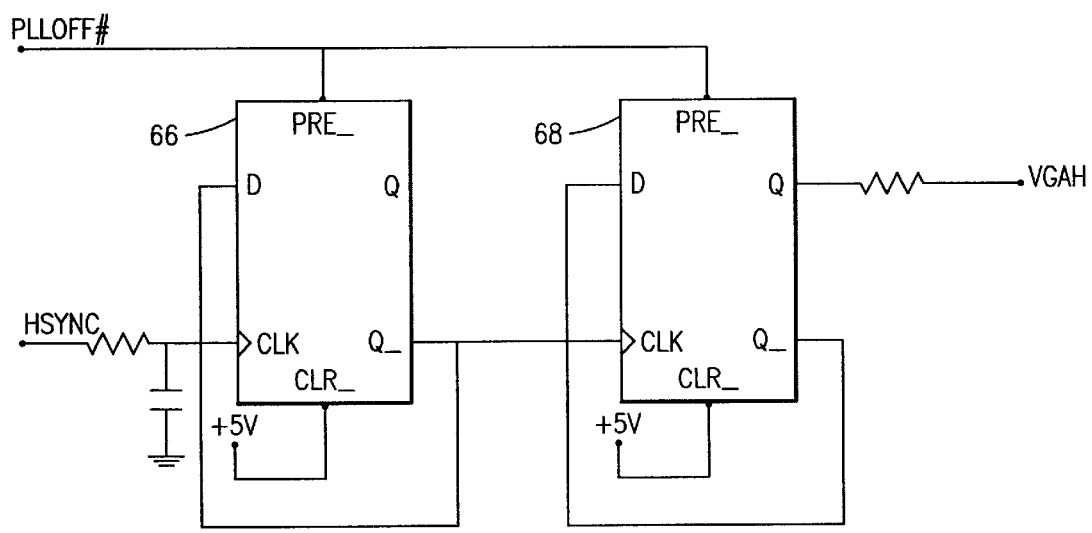
Figure 5B:
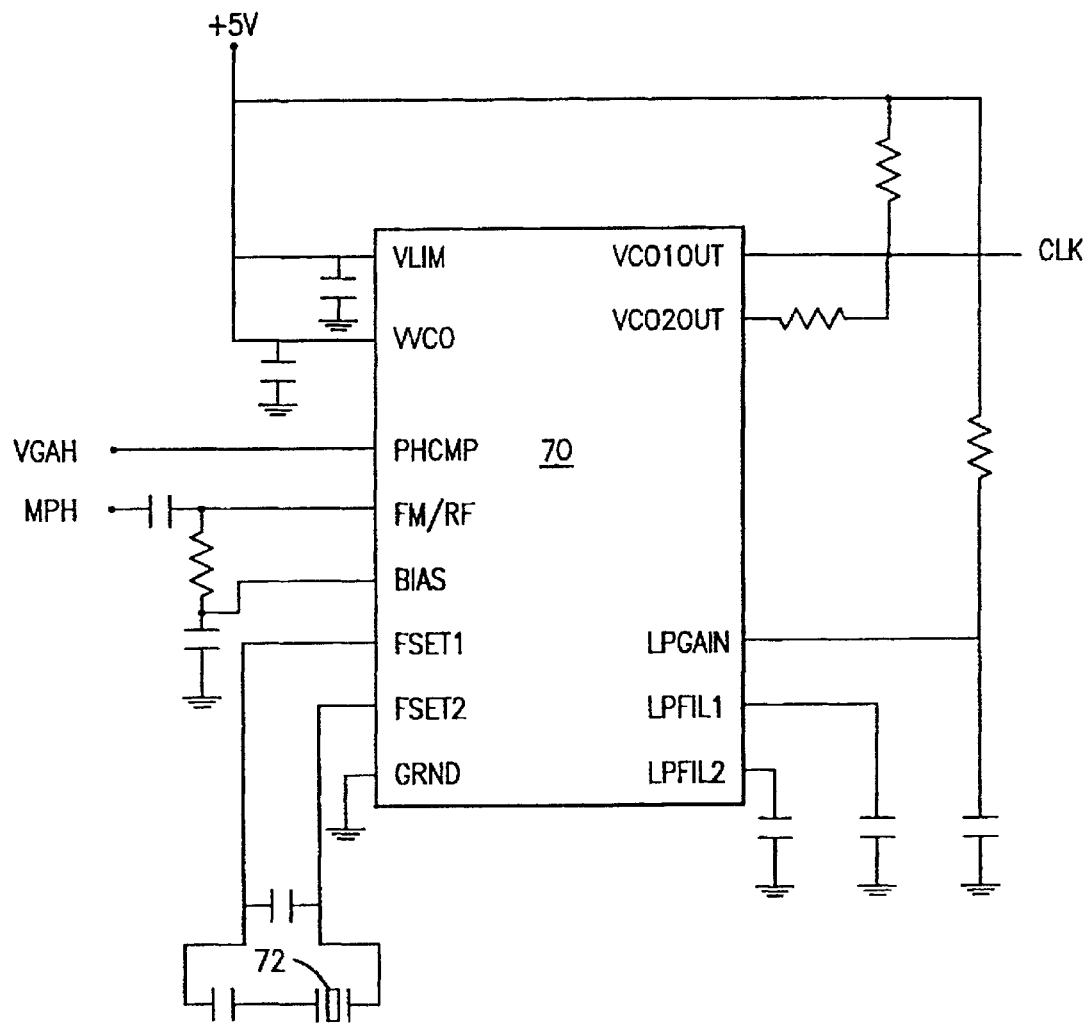

The genlock unit of FIG. 4 is now explained in more detail with respect to FIGS. 5a and 5b. In FIG. 5a, three 74HCT74 flip-flops 64, 66, and 68 are shown, though a person of skill in the art will appreciate that any type of flip-flop or latch may be suitable. The clock input of flip-flop 64 is connected to the MPHSYNC signal which originates from the video decoder 38 shown in FIG. 3. A PLLOFF# signal from the controller 48, also shown in FIG. 3, is connected to the preset input of the flip-flop 64. To enable the flip-flop 64, controller 48 deasserts the PLLOFF# signal. The resulting MPH signal at the non-inverting Q output follows the MPHSYNC signal by one clock period. To disable flip-flop 64, the controller 48 asserts the PLLOFF# signal which causes the MPH signal to remain at a constant state.

The HSYNC signal output of the graphics controller 44 is connected to the clock input of flip-flop 66. The flip-flop 66 inverts the HSYNC signal and outputs the inverted signal (which lags HSYNC by one clock period) on inverting output Q_. The inverted HSYNC signal is connected to the clock input of flip-flop 68. Flip-flop 68 outputs a VGAH signal at its non-inverting Q output. As a result, the VGAH signal is an inverted HSYNC signal delayed by two clock periods. Both flip-flop 66 and flip-flop 68 are connected to the PLLOFF# signal generated by the controller 48 at their preset inputs. When the controller 48 asserts the PLLOFF# signal, the VGAH signal remains at a constant state.

In the operation of this exemplary embodiment, the flip-flop 66 changes the polarity of the HSYNC signal to match the polarity of the MPHSYNC signal while flip-flops 64 and 68 ensure that their respective output signals, MPH and VGAH, are sampled at the same time.

The output signals MPH and VGAH are inputted to a phase lock loop (PLL) 70, shown in FIG. 5b. The PLL 70 in this embodiment is a NE564 manufactured and sold by Phillips Semiconductors, though a person of skill in the art would appreciate that other PLL devices may be suitable. The FM/RF input of the PLL 70 receives the MPH signal and uses this signal as the reference signal. The VGAH signal is connected to the phase compare (PHCMP) input of PLL 70. When the flip-flops 64, 66 and 68 are enabled, the PLL 70 locks onto the MPH signal and generates the CLK signal.

The FSET1 and FSET2 inputs to the PLL 70 are connected to a 14.31818 MHZ oscillating crystal 72. In this embodiment, 14.31818 MHZ is the standard or predetermined clock rate, though a person of skill in the art would appreciate that the standard clock rate may be set to any value suitable for operation of the graphics controller 44. When the flip-flops 64, 66 and 68 are disabled by the controller 48, the MPH and VGAH signals are constant. In response thereto, the PLL 70 locks onto the standard 14.31818 MHZ clock signal instead and generates the CLK signal with the standard 14.31818 MHZ frequency at output VCO1OUT.

In an alternate embodiment, the VGAH signal may be used as a reference signal and the refresh rate of the video data from the secondary source changed in response to the VGAH signal. However, this would require the ability to control the refresh rate of the video data from the secondary source.

As discussed above, the graphics controller 44 includes a clock logic unit 46 which generates the appropriate clock rates for the operation of the graphics controller, such as the MCLK signal, HSYNC and VSYNC signals. The clock logic unit 46 may itself include a phase lock loop unit for generation of these signals. Thus, the CLK output of PLL 70 may be driving another PLL within the graphics controller 44. To avoid instabilities, crystal oscillator 72, the genlock PLL and the graphics controller PLL must all be precise with very little jitter such that no additional noise is inserted into the clock signals.

The present invention thus reconciles the refresh rate of the graphics controller 44 to the refresh rate of a secondary video source using the genlock unit 42. This change of refresh rates prevents the duplication or dropping of fields on the monitor 30. The present invention may also disable the reconciling of the refresh rates and output a standard clock when there is no longer a secondary video data source. This feature allows the computer system to operate in computer mode, as well as other modes which utilize video data from a secondary source.

Any video data from a secondary source having a refresh rate other than one that matches the graphics controller refresh rate will benefit as well as video data that has a refresh rate which varies over time. The PLL 70 may require more time to lock onto the refresh rate of the video data from the secondary source or may lose its lock on the refresh rate if the refresh rate varies too much. The pull-in frequency range of the PLL 70 and hold-in frequency of the PLL 70 may be adjusted to account for such variances in frequency.

In addition, by allowing external control of the refresh rate of the graphics controller 44, the present invention may be used with a pre-manufactured graphics controller. This reduces the cost of design and manufacture of an ASIC type graphics controller.

Although the preferred embodiment of the present invention has been described, it will be understood that the invention is not limited to the embodiment disclosed, but is capable of numerous arrangements, modifications and substitutions without departing from the spirit of the invention as set forth and defined by the following claims.

What is claimed is:

1. A system for displaying graphics data on a display device, the system comprising:
   a graphics controller for the outputting graphics data to be displayed on the display device and the graphics controller further for outputting a first synchronization signal having a first frequency, the first synchronization signal being outputted from the graphics controller to the display device;
   a secondary source of video data available to the graphics controller;
   a genlock unit for outputting a clock signal to the graphics controller and for receiving as a feedback input the first synchronization signal output by the graphics controller, the genlock unit also for receiving a second synchronization signal associated with the secondary source of video data, the second synchronization signal having a second frequency different from the first frequency; and
   a graphics memory connected to the graphics controller, the graphics memory responsive to the clock signal output by the genlock unit;
   wherein the genlock unit is configured to generate the clock signal at the frequency of the second frequency based on a comparison of the first synchronization signal with the second synchronization signal, wherein the clock signal frequency is generated based on the phase difference between the first synchronization signal and the second synchronization signal and wherein the graphics controller is configured to generate the first synchronization signal outputted to the display device responsive to the clock signal frequency generated by the genlock unit.

2. The system of claim 1, wherein the graphics data memory transfers graphics data to the graphics controller and wherein the rate of transfer of the graphics data varies responsive to the genlock unit adjusting the frequency of the clock signal.

3. The computer system of claim 2, wherein said secondary source of video data is a convergence functionality module.

4. The computer system of claim 3, wherein the computer system further comprises a video decoder which decodes the video data from the convergence functionality module into graphics data.

5. The computer system of claim 4, wherein said video decoder generates said second synchronization signal received by said genlock unit corresponding to the refresh rate of said secondary source.

6. A method of generating a clock signal for a graphics controller in a computer system, the graphics controller configured to receive data from a graphics memory, the method comprising the steps of:
   determining whether the computer system is operating in a first one of two modes;
   in response to determining that the computer system is operating in a first one of two modes, generating a clock signal for the graphics controller at a frequency of a frequency associated with a refresh rate of a secondary source based on a comparison of a refresh rate of the graphics controller with the refresh rate of the secondary source, the clock signal modulated to reconcile the refresh rate of the graphics controller and the refresh rate of the secondary source;
   outputting a sync signal to a display device, the sync signal responsive to the generated clock signal; and
   adjusting a transfer rate of graphical data from the graphics memory to the graphics controller responsive to the generated clock signal;
   wherein the refresh rate of the secondary source is different from the refresh rate of the graphics controller, and the clock signal frequency is generated based on the phase difference between the refresh rate of the secondary source and the refresh rate of the graphics controller.

7. The method of claim 6, further comprising the step of:

in response to determining that the computer is operating in a second one of two modes, generating the clock signal for the graphics controller at a frequency corresponding to a selected frequency.

8. The method of claim 6 wherein said step of in response to determining that the computer system is operating in said first one of two modes, generating the clock signal for the graphics controller at a frequency modulated to reconcile the refresh rate of said graphics controller and the refresh rate of the secondary source, comprises the steps of:

monitoring the differences of the horizontal synchronization signal of the graphics Controller and the horizontal synchronization signal of the secondary signal.

9. The method of claim 8, wherein said step of in response to determining that the computer system is operating in said first one of two modes, generating the clock signal for the graphics controller at a frequency modulated to reconcile the refresh rate of said graphics controller and the refresh rate of the secondary source includes the step of:

generating the clock signal in response to a first control signal.

10. The method of claim 9 wherein said step of in response to determining that the computer is operating in a second one of two modes, generating the clock signal for the graphics controller at a frequency corresponding to a selected frequency, includes the of:

generating the clock signal at a frequency corresponding to a selected frequency in response to a second control signal.

11. A computer system, comprising:

a display;

a convergence functionality module which outputs video data at a first refresh rate;

a computer subsystem which operates in a personal computer functional mode and in a convergence functional mode, wherein the computer subsystem comprises:

a graphics controller for generating graphics data to the display at a second refresh rate different from the first refresh rate; and a genlock unit for generating a clock signal at a frequency of a frequency associated with the first refresh rate based on a comparison of the first refresh rate with the second refresh rate, the genlock unit for reconciling the first refresh rate of said convergence functionality module and second refresh rate of said graphics controller;

wherein the genlock unit is prevented from, reconciling said first refresh rate and said second refresh rate responsive to the computer system operating in the personal computer functional mode mode, wherein the graphics controller outputs a sync signal to the display, the sync signal responsive to the clock signal, and the clock signal frequency is generated based on the phase difference between the first and second refresh rates.

12. The computer system of claim 11, wherein said graphics controller generates graphics data and a first horizontal synchronization signal and said convergence functionality module outputs video data having a second horizontal synchronization signal.

13. The computer system of claim 12 wherein said genlock unit outputs a first clock signal having a predetermined clock frequency in response to a first control signal.

14. The computer system of claim 13, wherein said genlock unit outputs a second clock signal in response to a second control signal, said second clock signal having a frequency modulated to reconcile said first refresh rate and said second refresh rate by said genlock unit monitoring the phase differences of said first horizontal synchronization signal and said second horizontal synchronization signal.

15. The computer system of claim 14, wherein said computer subsystem further includes a controller which outputs a first control signal when said computer subsystem is operating said mode and outputs a second control signals when said computer subsystem is operating in said convergence functional mode.

16. The computer system of claim 15, wherein said controller outputs the second control signal when said computer subsystem is operating in a third mode having the functionality of said convergence functionality module and outputs the first control signal when said computer subsystem is operating in the personal functional computer mode.

17. The computer system of claim 11, further comprising a graphics memory for receiving graphics data from said convergence functionality module.

18. The computer system of claim 17 wherein said convergence functionality module comprises a television receiver and the video data is a television signal.

* * * * *

UNITED STATES PATENT AND TRADEMARK OFFICE
CERTIFICATE OF CORRECTION

PATENT NO. : 6,441,812 B1
DATED : August 27, 2002
INVENTOR(S) : Christopher D. Voltz It is certified that error appears in the above-identified patent and that said Letters Patent is hereby corrected as shown below:

Column 9,
Line 13, delete "Controller" and insert therefor -- controller --.
Line 28, after "includes the" insert -- step --.

Signed and Sealed this

Sixth Day of December, 2005

JON W. DUDAS
*Director of the United States Patent and Trademark Office*